United States Patent

Shimamune et al.

[11] Patent Number: 6,113,773
[45] Date of Patent: Sep. 5, 2000

[54] SEAWATER ELECTROLYSIS APPARATUS

[75] Inventors: Takayuki Shimamune; Yasuo Nakajima, both of Tokyo; Yoshiyuki Kawaguchi, Kanagawa, all of Japan

[73] Assignee: Permelec Electrode Ltd., Kanagawa, Japan

[21] Appl. No.: 09/166,797

[22] Filed: Oct. 6, 1998

[30] Foreign Application Priority Data

Oct. 8, 1997 [JP] Japan ................................ 9-275974

[51] Int. Cl.[7] .............................. C02F 1/461; C25B 1/00
[52] U.S. Cl. ........................ 205/466; 205/468; 204/265
[58] Field of Search ................................ 205/466, 468; 204/265

[56] References Cited

U.S. PATENT DOCUMENTS 5,647,968   7/1997   Fraser et al. .......................... 205/468
5,770,033   6/1998   Murphy et al. ........................ 205/468

*Primary Examiner*—Arun S. Phasge
*Attorney, Agent, or Firm*—Sughrue, Mion, Zinn, Macpeak & Seas, PLLC

[57] ABSTRACT

A seawater electrolysis apparatus for generating hydrogen peroxide from seawater by electrolysis to thereby treat the seawater. The seawater electrolysis apparatus comprises an electrolytic cell, a gas diffusion electrode partitioning the electrolytic cell into a gas chamber and an electrolysis chamber, an insoluble metal electrode disposed in the electrolysis chamber as an anode, an inlet and an outlet for passing seawater through the electrolysis chamber, an inlet for supplying an oxygen-containing gas to the gas chamber, and means for passing and diffusing at least part of the gas supplied to the gas chamber passing through the gas diffusion electrode and into the seawater, respectively.

17 Claims, 1 Drawing Sheet

SEAWATER ELECTROLYSIS APPARATUS

FIELD OF THE INVENTION

The present invention relates to a seawater electrolysis apparatus for use in generating hydrogen peroxide in seawater to prevent marine organisms from attaching to cooling pipes, etc., when the seawater is used as cooling water, etc.

BACKGROUND OF THE INVENTION

Hydrogen peroxide is useful as a basic chemical indispensable to the food, medicine, pulp, textile and semiconductor industries. Hitherto, hydrogen peroxide has been industrially produced by the anthraquinone process, which is a chemical process. However, there is a growing desire for an on-site hydrogen peroxide production apparatus. This is because hydrogen peroxide is an unstable substance difficult to store for long periods of time and from the standpoints of safety in transportation and pollution abatement.

In power plants and factories where seawater is utilized as cooling water, a technique for preventing organisms from attaching to the inside of a condenser has been employed which comprises directly electrolyzing seawater to generate hypochlorous acid, and utilizing its action on organisms to inhibit their attachment. However, restrictions are being placed on use of this technique from the standpoint of environmental conservation. This is because hypochlorous acid may react with marine organisms and organic substances present in seawater to form chlorinated organic substances in the seawater, and these reaction products in turn may cause secondary pollution.

On the other hand, it has been reported that addition of a minute amount of hydrogen peroxide to cooling water is sufficiently effective in preventing the attachment of organisms. It has further been reported that the addition of hydrogen peroxide is also effective in maintaining water in fish breeding farms. However, there are still problems concerning safety in transportation and pollution abatement as discussed above.

Investigative reports have hitherto been made on hydrogen peroxide synthesis techniques based on the reduction reaction of oxygen gas. U.S. Pat. No. 3,693,749 proposes several electrolysis apparatuses, while U.S. Pat. No. 4,384,931 discloses an electrolytic process for producing an alkaline hydrogen peroxide solution with an ion-exchange membrane. U.S. Pat. No. 3,969,201 discloses a hydrogen peroxide production apparatus including a carbon cathode having a three-dimensional structure and an ion-exchange membrane. However, the hydrogen peroxide solution thus obtained has limited use because the alkali concentration is too high for the concentration of hydrogen peroxide.

On the other hand, U.S. Pat. Nos. 4,406,758, 4,891,107 and 4,457,953 disclose methods in which a porous diaphragm material and a hydrophobic carbon cathode are used. In these methods, however, the operation is troublesome because the amount of electrolyte solution moving from the anode chamber to the cathode chamber, or the rate of movement, is difficult to control.

In the *Journal of the Electrochemical Society*, Vol.130, pp.1117—(1983), a method for stably obtaining an acidic hydrogen peroxide solution is proposed using a cation—and anion-exchange membrane while sulfuric acid is supplied to an intermediate chamber.

It has further been reported in *Denki Kagaku*, Vol.57, p.1073 (1989) that performance is improved by using united membrane electrodes as an anode. However, this technique is disadvantageous in cost because the electric power consumption is too high, and a fully satisfactory electrolysis apparatus based thereon has not yet been obtained.

These methods for hydrogen peroxide generation each is effective when the target compound is produced in an environment of an aqueous alkali solution. It is therefore necessary to supply an alkali ingredient as a raw material, and this also poses a transportation problem.

On the other hand, in view of the aforementioned problem associated with direct seawater electrolysis, it is certain that the use of hydrogen peroxide for seawater treatment is desirable from the standpoint of cost, and various investigations are being made thereon.

Among such techniques, the use of commercial hydrogen peroxide solutions may pose a problem with respect to adding to seawater chemicals which have not been derived from seawater itself, besides the problems described above. Namely, the addition of a synthetic chemical which has not been derived from the seawater itself may give rise to an environmental problem of contaminating the seawater itself. As a matter of course, if an alkali is externally supplied for alkali electrolysis for generating hydrogen peroxide, this may pose the same problem.

In order to avoid these problems, the present inventors previously proposed a method comprising subjecting seawater to salt separation to obtain an alkali, subsequently obtaining an aqueous hydrogen peroxide solution, and neutralizing the alkali with an acid separated from the seawater to thereby enable treatment with hydrogen peroxide. This method is nearly ideal in that environmental problems are minimal because there is absolutely no need to added an external chemical, and in that the amount of electric power required is exceedingly small. However, from the standpoint of actually conducting continuous electrolysis, there has been a need to completely remove calcium and magnesium from the seawater to obtain increased efficiency. There has also been a need for an electrolysis apparatus which has a simpler structure and which can be handled more easily.

SUMMARY OF THE INVENTION

It is therefore an object of the present invention to provide a seawater electrolysis apparatus which is capable of more stably and efficiently generating hydrogen peroxide from seawater by electrolysis, to thereby treat the seawater and solve the above-described problems of the prior art.

The present invention has achieved the above object by the following means. According to the invention, the growth of microorganisms present in seawater used as cooling water is inhibited with hydrogen peroxide that is generated by direct electrolysis of the seawater. It has thus become possible to prevent cooling pipes from becoming clogged by the growth of microorganisms.

Various embodiments of the present invention are described below.

(1) A seawater electrolysis apparatus which comprises an electrolytic cell comprising a gas diffusion electrode partitioning the electrolytic cell into a gas chamber and an electrolysis chamber and an insoluble metal electrode disposed in the electrolysis chamber as an anode, an inlet and an outlet for passing seawater through the electrolysis chamber, an inlet for supplying an oxygen-containing gas to the gas chamber, and means for passing and diffusing at least part of the gas supplied to the gas chamber through the gas diffusion electrode and into the seawater, respectively.

(2) The seawater electrolysis apparatus as described in (1) above, wherein the gas diffusion electrode comprises a semihydrophobic gas diffusion electrode comprising a support having thereon a hydrophilic layer having an electrode material deposited on the hydrophilic layer and a water-repellent gas diffusion layer, said electrode material comprising at least one of carbon and gold.

(3) The seawater electrolysis apparatus as described in (1) above, wherein the gas diffusion electrode comprises a porous polytetrafluoroethylene sheet having deposited thereon a three-dimensional electrode material comprising hydrophilic carbon.

(4) The seawater electrolysis apparatus as described in (1) above, wherein the anode comprises an insoluble metal electrode comprising titanium and an electrode material deposited thereon, said electrode material comprising a composite oxide of a platinum group metal and at least one of tantalum oxide and manganese oxide.

(5) The seawater electrolysis apparatus as described in (1) above, wherein the anode comprises an insoluble metal electrode having a coating made of an electrode material which comprises tungstic acid and manganese oxide, said anode having a high overvoltage in chlorine generation and a low overvoltage in oxygen generation.

Figure 1:
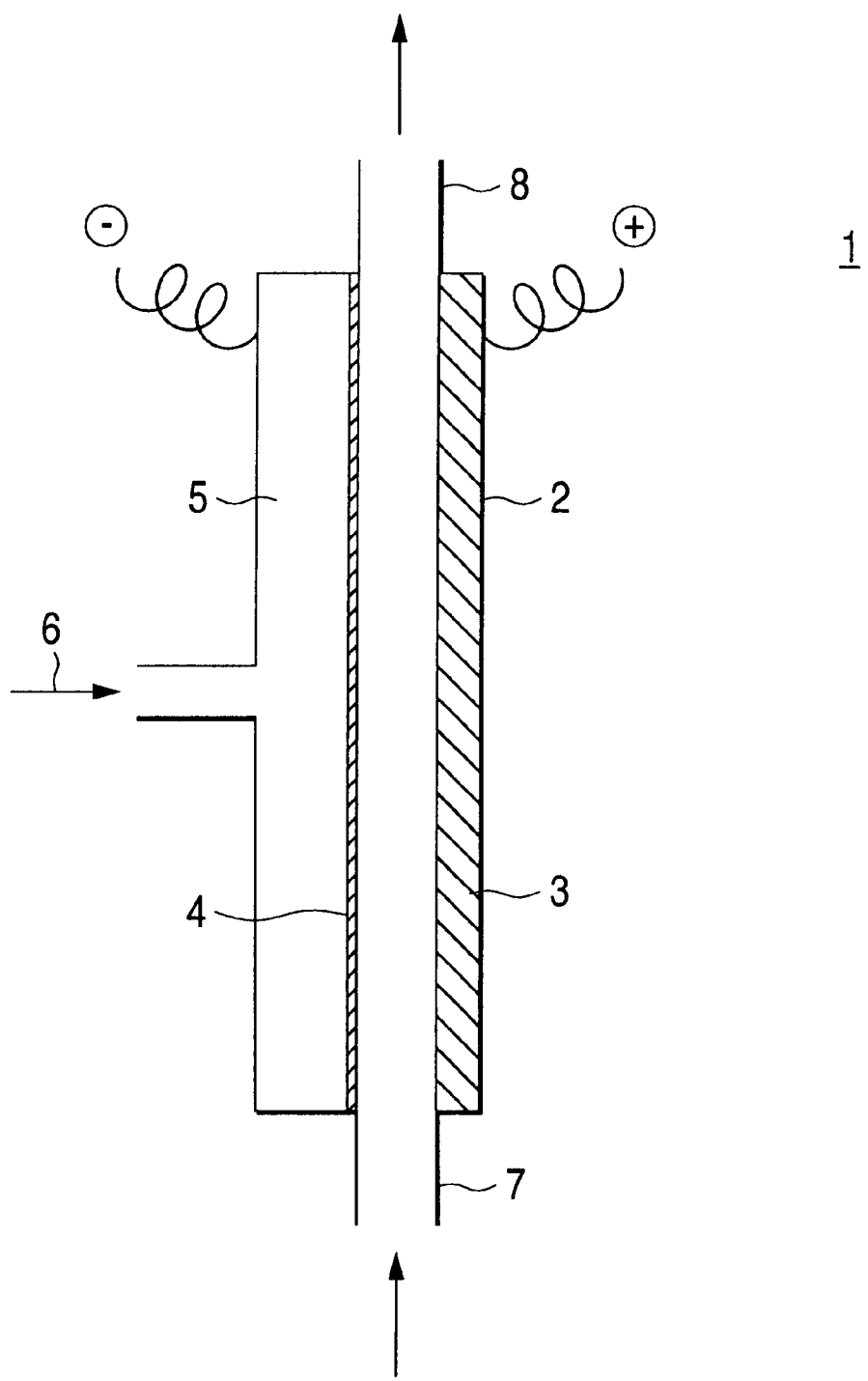
FIG. 1 is a schematic view of an electrolytic cell for use in the seawater electrolysis apparatus according to the present invention.

In the drawing:
1: Seawater electrolysis apparatus
2: Electrolytic cell
3: Anode
4: Gas diffusion electrode
5: Gas chamber
6: Air
7: Seawater inlet
8: Seawater outlet

DETAILED DESCRIPTION OF THE INVENTION

The seawater electrolysis apparatus of the present invention can be used in substantially the same manner as conventional apparatuses for generating hypochlorous acid by direct seawater electrolysis. This seawater electrolysis apparatus is almost free from trihalomethane generation, and is useful in generating hydrogen peroxide and treating seawater therewith.

In the direct electrolysis of seawater, if the seawater has a pH on the alkaline side, there is a problem in that ions of alkaline earth metals contained in the seawater deposit as hydroxides or carbonates, leading to apparatus clogging. When seawater electrolysis is conducted so as to generate hydrogen peroxide, the same problem arises. That is, because hydroxyl ions are generated together with hydrogen peroxide, the hydroxides of alkaline earth metals deposit around the gas diffusion electrode, resulting in clogging of the gas diffusion electrode or in reduced efficiency of hydrogen peroxide generation.

In the present invention, the hydroxyl ions thus generated are blown off together with deposits, if any, present around the gas diffusion electrode by the action of excess gas discharged from the gas diffusion electrode. Hence, it has become possible to almost completely prevent the deposition of hydroxides on and around the gas diffusion electrode due to turbulence caused by excess gas being discharged from the gas diffusion electrode.

It has thus been found that since the excess gas is always being discharged into seawater from the gas diffusion electrode through the reaction surface of the electrode, the hydroxyl ions which have been generated as a by-product of the reaction are driven off by the discharged gas to diffuse into the seawater. Namely, the hydroxyl ions mix with an excess of seawater, such that the pH of the seawater which is being treated is kept below 10, at and above which pH the deposition of alkaline earth metal hydroxides may occur. It has further been found that even if deposition has occurred around the gas diffusion electrode, the deposit is blown off by the gas, whereby substantial deposition can be prevented.

Air is preferably used as the feed gas. This is because even when 100% of the oxygen contained in the air participates in the generation of hydrogen peroxide, four fifths of the gas (nitrogen) still remains as an excess. Thus, the level of gas discharge desired in the present invention can be obtained by discharging the remaining gas into the seawater through the gas diffusion electrode.

It should be noted, however, that the low oxygen content in the feed gas may result in a reduced current efficiency and in insufficient contact of the oxygen contained in the feed gas with the electrode surface. Consequently, in order to obtain a high current efficiency, the gas is desirably supplied in an amount of about 1.5 times the theoretical amount. However, in the case of using air, an excessively large feed amount is undesirable because the amount of air which should be supplied is necessarily large. The feed amount of air is desirably about from 1.5 to 3 times the theoretical amount although it varies depending on the apparatus. Even if air is supplied in an amount exceeding 3 times the theoretical amount, only a negligible improvement in current efficiency is expected, and also the excessive air feeding requires a larger air feeding pump. From the above standpoint, either air enriched with oxygen or oxygen diluted with an inert gas can be used as a feed gas.

When air is supplied as the feed gas, the use of an ordinary gas diffusion electrode disadvantageously results in the generation and deposition of carbonates. This is because the seawater present around the gas diffusion electrode comes to have a high pH. For avoiding this problem, removal of $CO_2$ is usually necessary. In the present invention, however, $CO_2$ removal is unnecessary because the pH of the seawater is almost constant. Oxygen or oxygen-enriched air may be used as a feed gas, and the use of these is desirable for generating hydrogen peroxide. However, as a matter of course, the use thereof should be determined also in view of cost because oxygen gas and oxygen-enriched air are usually expensive.

The structure of the gas diffusion electrode through which the gas is filtered is not particularly limited. However, the electrode is desirably a semihydrophobic gas diffusion electrode to facilitate gas feeding through the electrode. The electrode desirably has low gas permeation resistance so as to facilitate gas diffusion through the electrode into seawater. In addition, the electrode desirably has water repellency sufficient to prevent seawater, as much as possible, from penetrating therethrough and entering the gas chamber. However, there is no need to employ a large gas pressure drop as in the case of ordinary gas diffusion electrodes, and it is rather desirable to employ an electrode through which free gas diffusion is possible.

The materials constituting the gas diffusion electrode are not particularly limited. It may comprise an ordinarily employed carbon fiber mesh as a base and carbon black particles deposited on the surface of the base by baking together with a fluororesin. Deposition of an electrode material is not especially necessary because the carbon black itself will perform this function. However, gold may also be used as an electrode material, and this improves the current efficiency to some degree. A gold catalyst can be obtained by applying an aqueous or alcoholic solution of a gold compound, e.g., chloroauric acid, to the electrolysis surface and baking the coating at about 200° C. in a reducing atmosphere, e.g., hydrogen, or an inert atmosphere, e.g., nitrogen or argon.

Although the baking can also be conducted in air, a baking temperature higher than that by about 100° C. is necessary. In this case, care should be taken because the baking may adversely influence the fluororesin depending on the baking conditions. A metal mesh as a collector may be brought into contact with the gas chamber side of the electrode. Because there are cases where seawater comes into contact with the mesh, the mesh is desirably made of a material having resistance to seawater. The most desirable is nickel plated with gold.

There are cases where seawater reaches the gas chamber when the sintered body is used alone. For preventing this, a porous fluororesin sheet can be attached to the gas electrode on its gas chamber side. This porous fluororesin sheet is desirably one which has been made electroconductive by impregnating with graphite, etc. In the case of a fluororesin sheet not having electrical conductivity, the fluororesin is partly removed or the sheet is otherwise processed beforehand so that voltage can be applied through the sheet. The anode for use in this electrolysis should be one which generates almost no chlorine when used in seawater. This is because if chlorine generation occurs, the chlorine may react with organic substances present in the seawater to pose the problem of generating trihalomethanes. If the generated chlorine changes into hypochlorous acid, the acid may react with the generated hydrogen peroxide to reduce the amount of hydrogen peroxide that is generated.

Preferred examples of the anode include an insoluble metal electrode comprising a titanium base and having deposited on the surface thereof iridium oxide and either of tantalum oxide and manganese oxide. Also desirable is an electrode which is an insoluble metal electrode having a surface coating comprising, for example, manganese dioxide or a combination of manganese dioxide and tungstic acid. Use of this anode for the electrolysis of seawater attains a current efficiency in chlorine generation of 5% or lower.

When used in electrolysis in which seawater is used as an electrolyte, the anode thus produced functions to anodize manganese present in the seawater to deposit manganese dioxide on the anode surface, whereby good current efficiency can be maintained.

Another technique for achieving this purpose is to diminish the chance of contact between the anode surface and chlorine ions present in the seawater. For example, an anode smaller than the cathode is employed. The use thereof results in a heightened current density and this alone is expected to considerably diminish chlorine generation in seawater, which originally has a sodium chloride concentration about one tenth that of the saturated aqueous solution. A more positive technique is to dispose a shield such as a filter cloth over the anode surface to inhibit fresh seawater from readily coming into direct contact with the anode surface, whereby the chlorine ion concentration of the seawater which is in contact with the anode surface can be reduced. Any of these techniques may be employed, and the selection thereof depends on the use conditions.

The flow of seawater in the electrolysis apparatus is desirably a nearly laminar flow, and it is also desirable that the hydrogen peroxide which has been generated should not come into contact with the anode surface. For attaining these objectives, the flow velosity of seawater is preferably about from 10 to 100 cm/sec, although it is not particularly limited. A shorter distance between the electrodes is desirable from the standpoint of reducing the cell voltage. However, a reduced electrode distance results, for example, in a higher possibility that a larger proportion of the generated hydrogen peroxide may be decomposed by anodization. Consequently, the electrode distance is usually desirably about from 3 to 20 mm.

The present invention will be explained below in more detail by reference to the following Examples. However, the present invention is not to be construed as being limited thereto.

EXAMPLE 1

An ELAT Electrode (trade name), manufactured by E-TEK Co. and prepared by depositing a fluororesin/carbon black mixture on the surfaces of carbon fibers and sintering the deposit, was used as a gas diffusion electrode. An aqueous PTFE resin suspension (P-30, manufactured by E.I. du Pont de Nemours and Co.) containing 20 wt % graphite powder was applied to the gas feed side of the electrode, and the coating was burned at 200° C. while applying a pressure of about 10 g/cm$^2$ to the coated electrode. Thus, the waterproofing properties of the gas feed side were improved. This electrode was attached to an electrolytic cell.

The electrolytic cell had a two-chamber structure composed of a gas chamber and an electrolysis chamber, as shown in FIG. 1. The anode used therein was a coated anode comprising: an insoluble metal electrode including a titanium plate as a base and having formed thereon a coating of a composite oxide of metals consisting of 45% iridium and 55% tantalum; and a coating of manganese oxide electrolytically formed on the surface of the insoluble metal electrode. When this electrode was used alone in seawater electrolysis to determine the efficiency of chlorine generation, the current efficiency was about 4%. This electrode was disposed as an anode in the electrolytic cell. A collector obtained by gold-plating a mesh formed by interlacing nickel wires was attached to the gas diffusion electrode so that the plated mesh was in intimate contact with the gas feed side of the electrode, and the resulting structure was used as a cathode.

The distance between the gas diffusion electrode and the anode was adjusted to 5 mm. Electrolysis was conducted while passing seawater through the space between the electrodes at a rate of 15 cm/sec. Air was supplied as a feed gas to the cathode, without any treatment, in a rate such that the oxygen feed amount was 1.5 times the theoretical amount. At this feed rate, the pressure of the air thus supplied was 1.2 atm. All of the excess gas was discharged into the seawater from the surface of the gas diffusion electrode. Under these conditions, electrolysis was conducted at a current density of 10 A/dm$^2$. As a result, hydrogen peroxide was generated in the seawater in an amount of 70 ppm. The current efficiency was 93% taking into account decomposition by hypochlorous acid generated on the anode side.

The electrolysis was continued for about 500 hours. As a result, no deposits were observed around the gas diffusion electrode, even though the current efficiency decreased by about 1%. The electrolytic voltage was from 3.4 to 3.6 V.

On the other hand, pure oxygen was supplied as a feed gas in an amount about 1.5 times the theoretical amount so that the excess gas was discharged into the electrolytic cell substantially without forming bubbles. As a result, the initial current efficiency was 93% or higher, showing that the use of pure oxygen was effective. However, the formation of a white deposit on the gas electrode surface came to be clearly observed after about 100 hours of the continuous electrolysis. After 500 hours, the current efficiency had decreased to 80%.

EXAMPLE 2

A porous PTFE sheet having a thickness of 0.1 mm and containing graphite particles was thermocompression-bonded to the gas chamber side of the same gas electrode base as in Example 1. Gold was then deposited on the electrode material on the electrolyte chamber side by applying an aqueous solution of chloroauric acid on the electrode surface and heating the coating in a hydrogen atmosphere at 200° C. for 15 minutes. The deposition amount of gold was determined from the resultant weight increase, and was found to be 2 g/m$^2$.

This electrode was attached to the same electrolytic cell as in Example 1, and electrolysis was conducted under the same conditions as in Example 1. The anode used therein was an insoluble metal electrode comprising iridium oxide and tantalum oxide and having a manganese oxide coating electrolytically formed on the surface thereof.

Electrolysis was conducted under the same conditions as in Example 1. As a result, hydrogen peroxide was generated in the seawater in an amount of 70 ppm and the initial current efficiency was 93%, which results were the same as in Example 1. However, the current efficiency remained at 93% even after 500 hours. Deposition did not occur at all. The electrolytic voltage was from 3.4 to 3.6 V.

According to the present invention, the following effects are obtained.

(1) Hydrogen peroxide can be generated with high efficiency in seawater with an electrolytic cell having an exceedingly simple structure.

(2) No deposits are generated on the surface of the cathode comprising a gas diffusion electrode, whereby long-term stable electrolysis is possible.

(3) Stable current efficiency is obtained over a long period of operation.

(4) Because almost no deposits are formed, maintenance is extremely easy.

(5) Because the feed gas may be unmodified air, the equipment can be simple and the operation cost can be low.

(6) Because chlorine is not generated, the electrolysis generates almost no pollutants causing secondary pollution, e.g., organochlorine compounds.

While the invention has been described in detail and with reference to specific embodiments thereof, it will be apparent to one skilled in the art that various changes and modifications can be made therein without departing from the spirit and scope thereof.

What is claimed is:

1. A seawater electrolysis apparatus which comprises an electrolytic cell comprising a gas diffusion electrode partitioning the electrolytic cell into a gas chamber and an electrolysis chamber, an insoluble metal electrode disposed in the electrolysis chamber as an anode, an inlet and an outlet for passing seawater through the electrolysis chamber, an inlet for supplying an oxygen-containing gas to the gas chamber, and means for passing and diffusing at least part of the gas supplied to the gas chamber through the gas diffusion electrode and into the seawater, respectively, wherein there is no membrane between the electrodes.

2. The seawater electrolysis apparatus of claim 1, wherein said gas diffusion electrode comprises a semihydrophobic gas diffusion electrode comprising a support having thereon a hydrophilic layer having an electrode material deposited on the hydropholic layer and a water-repellent gas diffusion layer, said electrode material comprising at least one of carbon and gold.

3. The seawater electrolysis apparatus of claim 2, wherein said water-repellent gas diffusion layer is provided on the side of the gas diffusion electrode facing the gas chamber.

4. The seawater electrolysis apparatus of claim 2, wherein said gas diffusion electrode comprises a carbon fiber base, a sintered deposit of a fluororesin/carbon clack mixture provided on said base, and a sintered layer of an aqueous PTFE resin suspension containing graphite powder provided on the side of the gas diffusion electrode facing the gas chamber.

5. The seawater electrolysis apparatus of claim 1, wherein said gas diffusion electrode comprises a porous polytetrafluoroethylene sheet having deposited thereon a three-dimensional electrode material comprising hydrophilic carbon.

6. The seawater electrolysis apparatus of claim 1, wherein said anode comprises an insoluble metal electrode comprising titanium and an electrode material deposited thereon which comprises a composite oxide of a platinum group metal and at least one of tantalum oxide and manganese oxide.

7. The seawater electrolysis apparatus of claim 1, wherein the anode comprises an insoluble metal electrode having a coating made of an electrode material which comprises tungstic acid and manganese oxide.

8. The seawater electrolysis apparatus of claim 1, further comprising means for supplying an oxygen-containing gas to the gas chamber in an amount of 1.5 to 3 times the theoretical amount of gas used for electrolysis.

9. The seawater electrolysis apparatus of claim 1, wherein said passing and diffusing means comprises means for passing and diffusing the gas supplied to the gas chamber through the gas diffusion electrode and into the seawater, respectively, at a rate sufficient to prevent deposits from forming on the side of the gas diffusion electrode facing the electrolysis chamber.

10. The seawater electrolysis apparatus of claim 1, wherein the side of the anode facing the electrolysis chamber has a smaller surface area than the side of the gas diffusion electrode facing the electrolysis chamber.

11. The seawater electrolysis apparatus of claim 1, which comprises means for electrolyzing seawater to thereby generate hydrogen peroxide in the seawater.

12. The seawater electrolysis apparatus of claim 1, wherein said electrolytic cell is a two-chamber electrolytic cell, said first chamber being a gas chamber and said chamber being an electrolysis chamber.

13. The seawater electrolysis apparatus of claim 1, comprising means for supplying said oxygen-containing gas to the gas chamber under pressure.

14. The seawater electrolysis apparatus of claim 1, comprising means for supplying an oxygen-containing gas to the gas chamber under a pressure of 1.2 atm or higher.

15. A method for generating hydrogen peroxide in seawater by electrolysis, which comprises:

providing an electrolytic cell comprising a gas diffusion electrode partitioning the electrolytic cell into a gas chamber and an electrolysis chamber, an insoluble metal electrode disposed in the electrolysis chamber as an anode, an inlet and an outlet for passing seawater through the electrolysis chamber, and an inlet for supplying an oxygen-containing gas to the gas chamber;

passing seawater through the electrolysis chamber;

supplying an oxygen-containing gas to the gas chamber at a rate such that at least part of the gas supplied to the gas chamber passes through the gas diffusion electrode and diffuses into the seawater; and applying an electrolyzing voltage to the anode and the gas diffusion electrode.

16. The method for generating hydrogen peroxide in seawater by electrolysis of claim 15, which comprises supplying an oxygen-containing gas to the gas chamber in an amount of 1.5 to 3 times the theoretical amount of gas used for electrolysis.

17. The method for generating hydrogen peroxide in seawater by electrolysis of claim 15, which comprises passing and diffusing the gas supplied to the gas chamber through the gas diffusion electrode and into the seawater at a rate sufficient to prevent deposits from forming on the side of the gas diffusion electrode facing the electrolysis chamber.

* * * * *